United States Patent
Dorman et al.

(10) Patent No.: US 9,482,277 B2
(45) Date of Patent: Nov. 1, 2016

(54) AIR BEARING SHAFT CHROME PLATING

(71) Applicant: Hamilton Sundstrand Corporation, Windsor Locks, CT (US)

(72) Inventors: David A. Dorman, Feeding Hills, MA (US); Peter A. Wierzbowski, Old Saybrook, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 71 days.

(21) Appl. No.: 14/584,505

(22) Filed: Dec. 29, 2014

(65) Prior Publication Data

US 2016/0186806 A1 Jun. 30, 2016

(51) Int. Cl.
*F16C 32/06* (2006.01)
*F16C 33/12* (2006.01)
*F16C 17/02* (2006.01)

(52) U.S. Cl.
CPC ........... *F16C 33/124* (2013.01); *F16C 17/024* (2013.01)

(58) Field of Classification Search
CPC ...... F16C 17/02; F16C 17/024; F16C 17/12; F16C 33/12; F16C 33/121; F16C 33/124; F16C 33/125; F16C 2223/70
See application file for complete search history.

(56) References Cited

U.S. PATENT DOCUMENTS

| 5,921,683 | A | 7/1999 | Merritt et al. | |
|---|---|---|---|---|
| 7,220,055 | B2 * | 5/2007 | Hertel | F16C 32/0651 384/119 |
| 8,419,283 | B2 | 4/2013 | McAuliffe et al. | |
| 8,475,114 | B2 | 7/2013 | Rosen et al. | |
| 2009/0046960 | A1 * | 2/2009 | Hibi | F16C 17/02 384/107 |
| 2012/0011878 | A1 | 1/2012 | Hipsky | |
| 2012/0114463 | A1 | 5/2012 | Beers et al. | |
| 2012/0281937 | A1 * | 11/2012 | Heshmat | F16C 17/024 384/106 |
| 2013/0078090 | A1 | 3/2013 | Beers et al. | |
| 2014/0199167 | A1 | 7/2014 | Beers et al. | |

\* cited by examiner

*Primary Examiner* — James Pilkington
(74) *Attorney, Agent, or Firm* — Kinney & Lange, P.A.

(57) ABSTRACT

An air bearing shaft for a cabin air compressor includes a first edge and a second edge, a surface extending between the first edge and the second edge, and chrome plating on the surface between the first edge and the second edge. L1 is a first distance from the first edge of the air bearing shaft to a first end of the chrome plating. L2 is a second distance from the first edge of the air bearing shaft to a second end of the chrome plating.

13 Claims, 3 Drawing Sheets

AIR BEARING SHAFT CHROME PLATING

BACKGROUND

The present disclosure relates to aircraft environmental control systems. Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. The motor drives a tie rod, which causes the tie rod to rotate and drive the compressor section. An air bearing assembly keeps the tie rod aligned and supports the tie rod as the tie rod rotates. An air bearing shaft is connected to the tie rod and rotates with the tie rod. A stationary bearing sleeve surrounds the air bearing shaft and is lined with bearing foil. When the air bearing shaft rotates with the tie rod, an air film is generated between the bearing sleeve and the air bearing shaft such that the air bearing shaft does not contact the bearing foil or bearing sleeve. When the shaft slows down, the shaft makes contact with the bearing foil, and heats up due to friction between the bearing foil and the shaft. This friction can cause excessive heat buildup, which can cause significant wear of the air bearing components and also lead to premature bearing failure.

SUMMARY

An air bearing shaft for a cabin air compressor includes a first edge and a second edge, a surface extending between the first edge and the second edge, and chrome plating on the surface between the first edge and the second edge. L1 is a first distance from the first edge of the air bearing shaft to a first end of the chrome plating. L2 is a second distance from the first edge of the air bearing shaft to a second end of the chrome plating.

An air bearing assembly for a cabin air compressor includes an air bearing shaft, a bearing sleeve coaxially positioned around the air bearing shaft, and bearing foil lining an inner surface of the bearing sleeve. The air bearing shaft includes a first edge and a second edge, a surface extending between the first edge and the second edge, and chrome plating on the surface between the first edge and the second edge. L1 is a first distance from the first edge of the air bearing shaft to a first end of the chrome plating. L2 is a second distance from the first edge of the air bearing shaft to a second end of the chrome plating.

DETAILED DESCRIPTION

Figure 1:
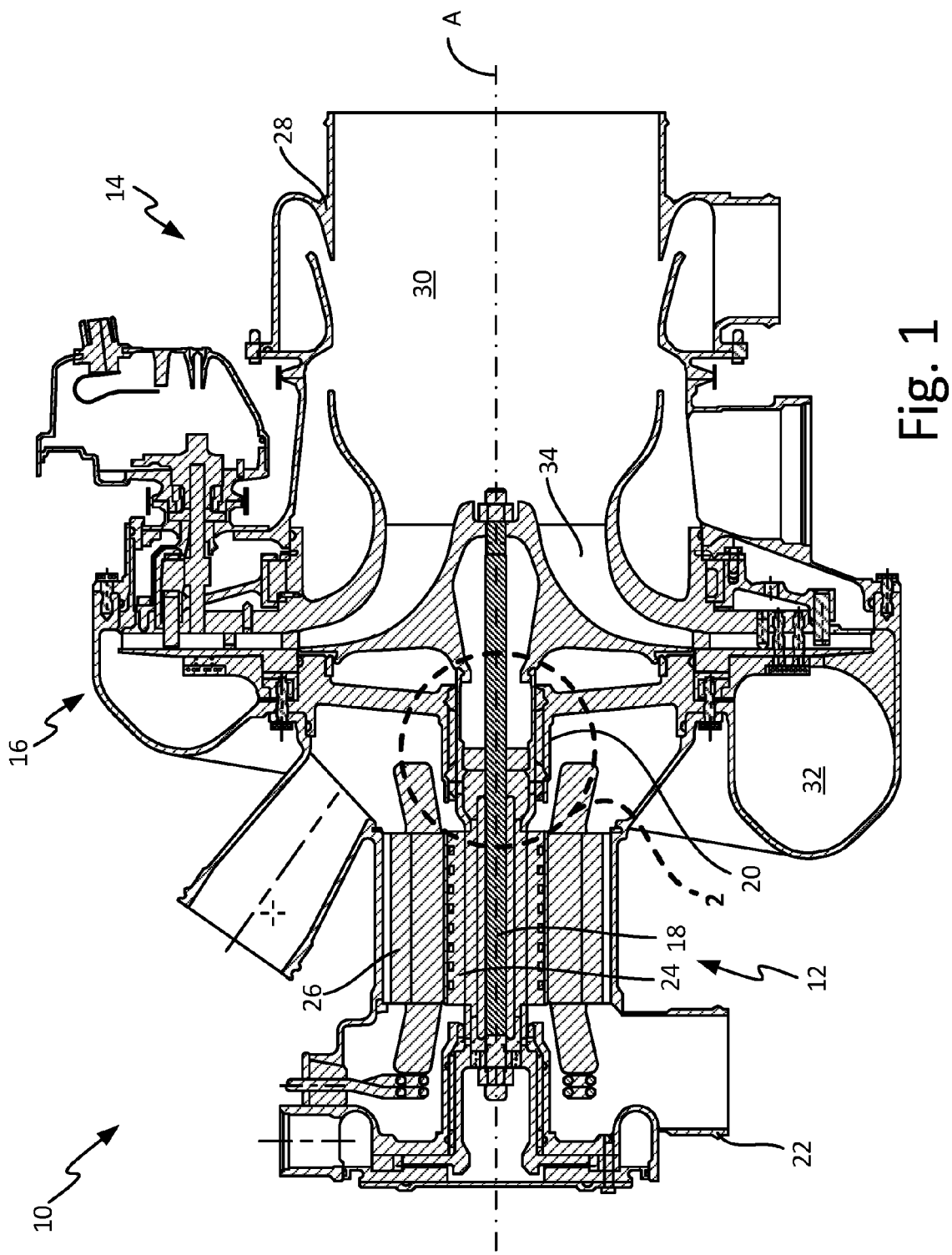
FIG. 1 is a cross-sectional view of an air compressor.

FIG. 1 is a cross-sectional view of air compressor 10, which includes motor 12, compressor section 14, variable diffuser 16, tie rod 18, and air bearing 20. Also shown in FIG. 1 is axis A, which is the rotational axis of motor 12 and compressor section 14. Motor 12 drives compressor section 14 in air compressor 10. Air will enter into compressor section 14 and then flow through variable diffuser 16 before exiting compressor section 14. Tie rod 18 extends through air compressor 10 and is centered on axis A. Motor 12 and compressor section 14 are mounted to tie rod 18.

Motor 12 includes motor housing 22, motor rotor 24, and motor stator 26. Motor housing 22 surrounds motor rotor 24 and motor stator 26. Motor 12 is an electric motor with motor rotor 24 disposed within motor stator 26. Motor rotor 24 is rotatable about axis A. Motor rotor 12 is mounted to tie rod 18 to drive rotation of tie rod 18 in air compressor 10. Air bearing assembly 20 keeps tie rod 18 aligned and supports tie rod 18 as it rotates.

Compressor section 14 includes compressor housing 28, compressor inlet 30, compressor outlet 32, and compressor rotor 34. Compressor housing 28 includes a duct that forms compressor inlet 30 and a duct that forms compressor outlet 32. Compressor inlet 30 draws air into compressor section 14. Positioned in compressor housing 28 is compressor rotor 34. Compressor rotor 34 is driven with motor 12 and is mounted on tie rod 18 to rotate with motor rotor 24 and tie rod 18 about axis A. Air that is drawn into compressor section 14 through compressor inlet 30 is compressed with compressor rotor 34. The compressor air is then routed through variable diffuser 16 before exiting compressor section 14 through compressor outlet 32.

Figure 2:
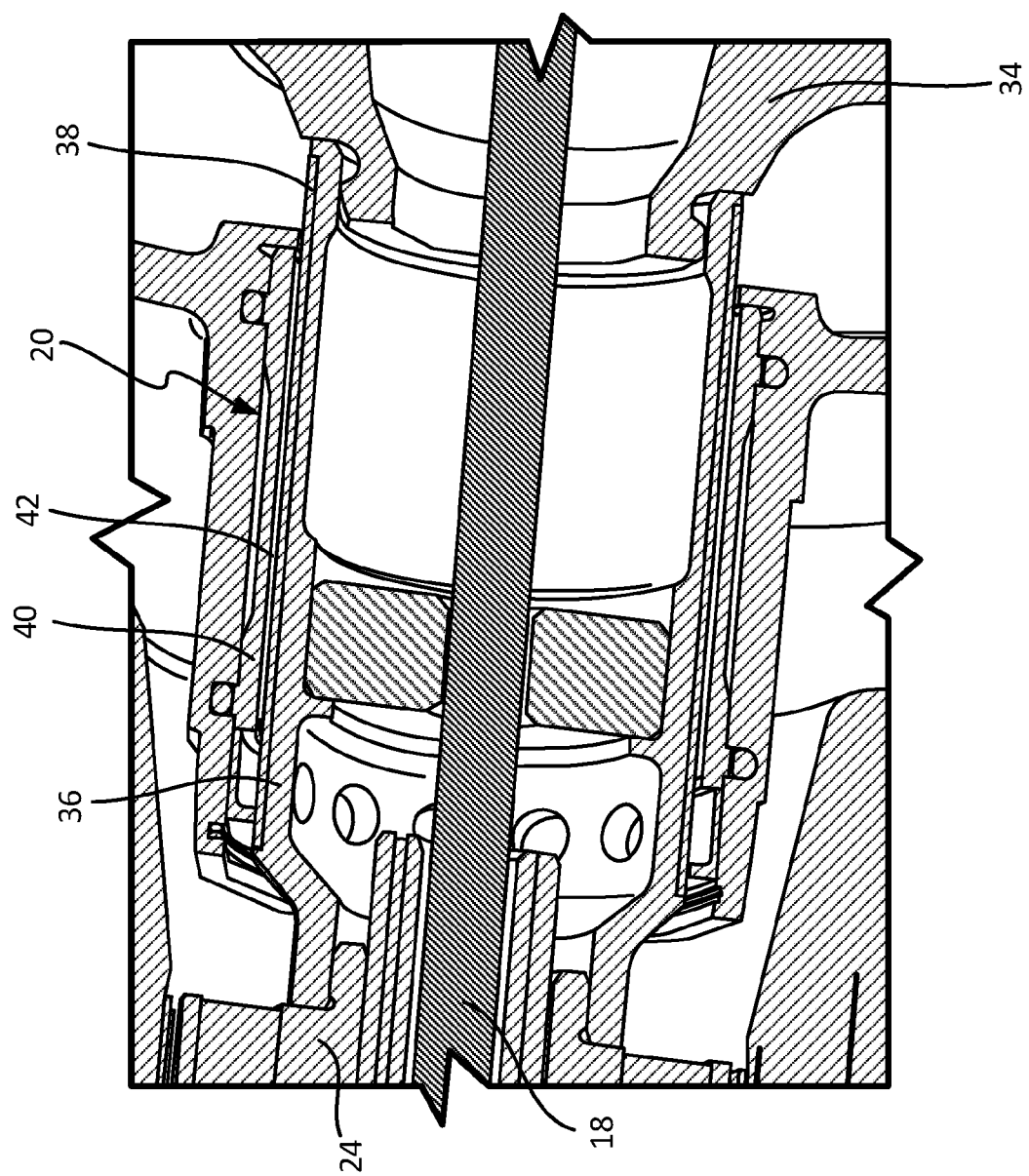
FIG. 2 is an enlarged cross-sectional view of portion 2 of the air compressor shown in FIG. 1.

FIG. 2 is an enlarged cross-sectional view of portion 2 of air compressor 10 of FIG. 1. Parts of air compressor 10 that are shown in FIG. 2 include tie rod 18, air bearing assembly 20, motor rotor 24, and compressor rotor 34. Air bearing assembly 20 includes air bearing shaft 36, chrome plating 38, bearing sleeve 40, and bearing foil 42. Air bearing shaft 36 is connected to tie rod 18 and rotates with tie rod 18. Chrome plating 38 is chromium that covers a portion of air bearing shaft 36. Bearing sleeve 40 surrounds air bearing shaft 36 and is lined with bearing foil 42.

When tie rod 18 and air bearing shaft 36 rotate, an air film is generated between bearing sleeve 40 and air bearing shaft 36 such that air bearing shaft 36 does not contact bearing foil 42 or bearing sleeve 40. When air bearing shaft 36 slows down, chrome plating 38 on air bearing shaft 36 makes contact with bearing foil 42 and heats up due to friction between bearing foil 42 and chrome plating 38. Air bearing assembly 20 is advantageous, because chrome plating 38 on air bearing shaft 36 extends beyond bearing sleeve 40 and bearing foil 42 such that bearing foil 42 does not contact the surface of air bearing shaft 36.

Bearing shaft 36 is made of a softer metal, such as stainless steel, while chrome plating 38 is a harder metal. In prior art air bearing assemblies, bearing foil 42 extends beyond chrome plating 38, which results in contact between the softer metal of air bearing shaft 36 and bearing foil 42. This can cause excessive heat buildup, which can cause significant wear of air bearing shaft 36 and also lead to premature failure of air bearing shaft 36. The harder metal of chrome plating 38 reduces the coefficient of friction and can prevent excessive heat buildup. Chrome plating 38 can have a mirror finish, which allows further reduction in friction between chrome plating 38 and bearing foil 42. This reduces wear of air bearing shaft 36 and can prevent premature failure of air bearing shaft 36.

Figure 3:
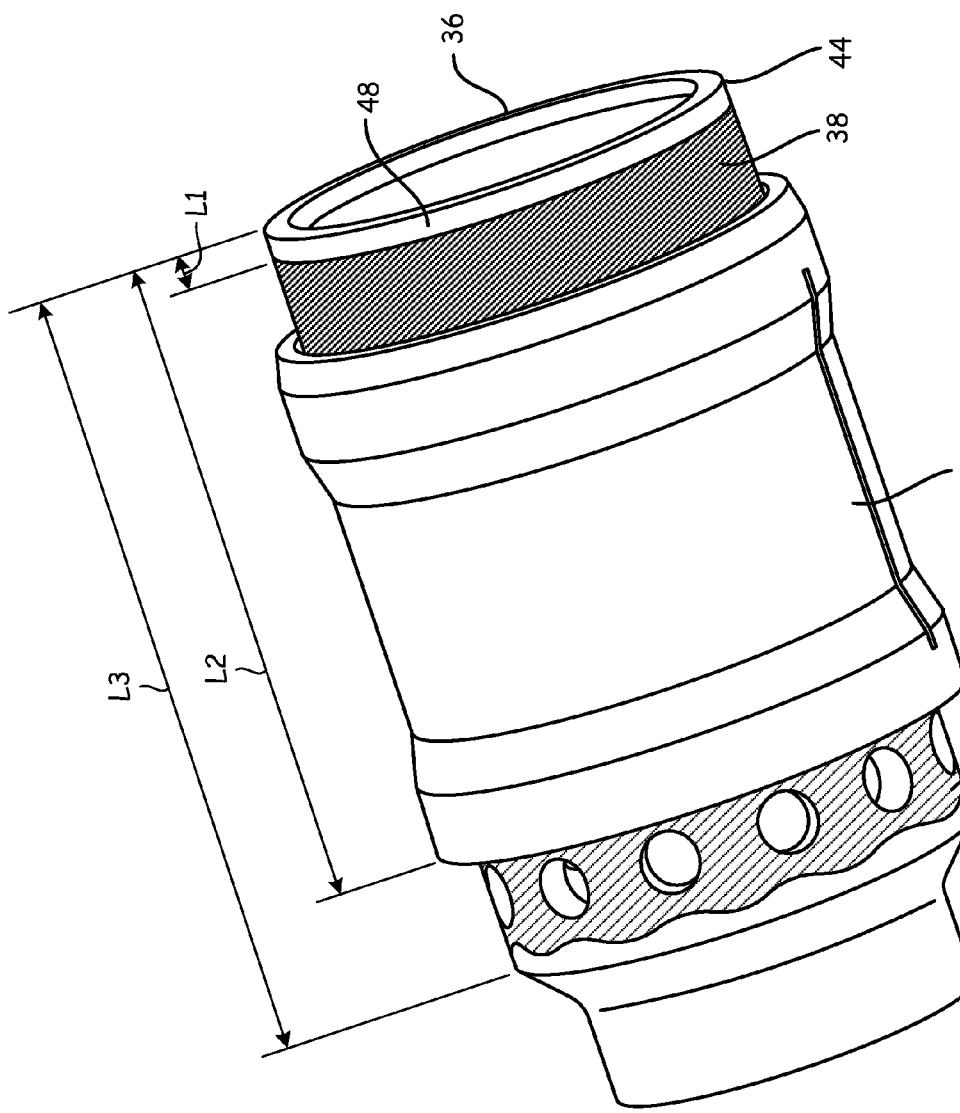
FIG. 3 is a perspective view of an air bearing assembly of the air compressor of FIG. 1.

FIG. 3 is a perspective view of air bearing assembly 20. Air bearing assembly 20 includes air bearing shaft 36, chrome plating 38, bearing sleeve 40, and bearing foil 42 (shown in FIG. 2). Air bearing shaft 36 includes first edge 44, second edge 46, and surface 48. Chrome plating 38 covers part of surface 48 of air bearing shaft 36 between first edge 44 and second edge 46. Air bearing assembly 20 also includes chrome fade out 50 on surface 48.

Also shown in FIG. 3 are distances L1, L2, and L3. L1 is the distance between first edge 44 of air bearing shaft 36 and a first end of chrome plating 38. L1 is between 0.0254 centimeters) (0.010 inches) and 1.016 centimeters (0.400 inches). L2 is the distance between first edge 44 of air bearing shaft 36 and a second end of chrome plating 38. L2 is between 6.8072 centimeters (2.680 inches) and 8.0772 (3.180 inches). L3 is the distance from first edge 44 of air bearing shaft 36 and the end of chrome fade out 50. L3 is between 7.0612 centimeters (2.680 inches) and 8.0772 centimeters (3.180 inches).

Table 1 below is a list of different ratios of lengths L1-L3.

TABLE 1

A list of ratios of length L1-L3.

| Ratio | Minimum | Maximum |
| --- | --- | --- |
| L2/L1 | 6.700 | 318.0 |
| L3/L2 | 0.874 | 1.187 |
| L3/L1 | 6.950 | 318.0 |

Chrome plating 38 on surface 48 extends between L1 and L2 such that chrome plating 38 extends beyond bearing sleeve 40 and bearing foil 42. Chrome plating 38 cannot extend beyond second edge 46 of air bearing shaft 36. In one embodiment, chrome plating 38 can extend all the way to second edge 46 (L2=9.677 centimeters (3.810 inches). In an alternative embodiment, chrome plating 38 does not extend all the way to second edge 46 (L2 is less than 9.677 centimeters (3.810 inches), and chrome fade 50 extends between L2 and L3. While chrome plating 38 is uniform to provide consistent contact with bearing foil 42, chrome fade out 50 can be non-uniform chrome extending into a permissible fade out area on surface 48 of air bearing shaft 36. The dimensions of chrome plating 38 are advantageous, because chrome plating 38 prevents contact of the soft metal of air bearing shaft 36 with bearing foil 42, thereby extending the life of air bearing shaft 36 and air bearing assembly 20.

Discussion of Possible Embodiments

The following are non-exclusive descriptions of possible embodiments of the present invention.

An air bearing shaft for a cabin air compressor according to an exemplary embodiment of this disclosure, among other possible things includes a first edge and a second edge, a surface extending between the first edge and the second edge, and chrome plating on the surface between the first edge and the second edge. L1 is a first distance from the first edge of the air bearing shaft to a first end of the chrome plating. L2 is a second distance from the first edge of the air bearing shaft to a second end of the chrome plating.

The air bearing shaft of the preceding paragraph can optionally include, additionally and/or alternatively, any one or more of the following features, configurations and/or additional components:

A further embodiment of the foregoing air bearing shaft, wherein a ratio of L2 to L1 is between 6.700 and 318.000.

A further embodiment of any of the foregoing air bearing shafts, and further including chrome fade out on the surface of the air bearing shaft between the second end of the chrome plating and the second edge of the air bearing shaft; wherein L3 is a third distance from the first edge of the air bearing shaft to an end of the chrome fade out.

A further embodiment of any of the foregoing air bearing shafts, wherein a ratio of L3 to L2 is between 0.874 and 1.187.

A further embodiment of any of the foregoing air bearing shafts, wherein a ratio of L3 to L1 is between 6.950 and 318.000.

A further embodiment of any of the foregoing air bearing shafts, wherein L1 is between 0.0254 centimeters (0.010 inches) and 1.016 centimeters (0.400 inches), L2 is between 6.8072 centimeters (2.680 inches) and 8.0772 centimeters (3.180 inches), and L3 is between 7.0612 centimeters (2.680 inches) and 8.0772 centimeters (3.180 inches).

A further embodiment of any of the foregoing air bearing shafts, wherein the chrome plating includes a mirror finish.

An air bearing assembly for a cabin air compressor according to an exemplary embodiment of this disclosure, among other possible things includes an air bearing shaft, a bearing sleeve configured to receive the air bearing shaft, and bearing foil lining an inner surface of the bearing sleeve. The air bearing shaft compressor includes a first edge and a second edge, a surface extending between the first edge and the second edge, and chrome plating on the surface between the first edge and the second edge. L1 is a first distance from the first edge of the air bearing shaft to a first end of the chrome plating. L2 is a second distance from the first edge of the air bearing shaft to a second end of the chrome plating.

The air bearing assembly of the preceding paragraph can optionally include, additionally and/or alternatively, any one or more of the following features, configurations and/or additional components:

A further embodiment of the foregoing air bearing assembly, wherein the chrome plating on the surface of the air bearing shaft extends beyond the bearing foil such that the bearing foil does not contact the surface of the air bearing shaft.

A further embodiment of any of air bearing assemblies, wherein a ratio of L2 to L1 is between 6.700 and 318.000.

A further embodiment of any of the foregoing air bearing assemblies, wherein the air bearing shaft further includes chrome fade out on the surface of the air bearing shaft between the second end of the chrome plating and the second edge of the air bearing shaft; wherein L3 is a third distance from the first edge of the air bearing shaft to an end of the chrome fade out.

A further embodiment of any of the foregoing air bearing assemblies, wherein a ratio of L3 to L2 is between 0.874 and 1.187.

A further embodiment of any of the foregoing air bearing assemblies, wherein a ratio of L3 to L1 is between 6.950 and 318.000.

A further embodiment of any of the foregoing air bearing assemblies, wherein L1 is between 0.0254 centimeters (0.010 inches) and 1.016 centimeters 0.400 inches, L2 is between 6.8072 centimeters (2.680 inches) and 8.0772 centimeters (3.180 inches), and L3 is between 7.0612 centimeters (2.680 inches) and 8.0772 centimeters (3.180 inches).

A further embodiment of any of the foregoing air bearing assemblies, wherein the chrome plating on the air bearing shaft includes a mirror finish.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air bearing shaft for a cabin air compressor, the air bearing shaft comprising:
   a first edge and a second edge;
   a surface extending between the first edge and the second edge; and
   chrome plating on the surface between the first edge and the second edge;
   wherein L1 is a first distance from the first edge of the air bearing shaft to a first end of the chrome plating;
   wherein L2 is a second distance from the first edge of the air bearing shaft to a second end of the chrome plating;
   a chrome fade out on the surface of the air bearing shaft between the second end of the chrome plating and the second edge of the air bearing shaft; and
   wherein L3 is a third distance from the first edge of the air bearing shaft to an end of the chrome fade out.

2. The air bearing shaft of claim 1, wherein a ratio of L2 to L1 is between 6.700 and 318.000.

3. The air bearing of claim 1, wherein a ratio of L3 to L2 is between 0.874 and 1.187.

4. The air bearing shaft of claim 1, wherein a ratio of L3 to L1 is between 6.950 and 318.000.

5. The air bearing shaft of claim 1, wherein L1 is between 0.0254 centimeters (0.010 inches) and 1.016 centimeters 0.400 inches, L2 is between 6.8072 centimeters (2.680 inches) and 8.0772 centimeters (3.180 inches), and L3 is between 6.8072 centimeters (2.680 inches) and 8.0772 centimeters (3.180 inches).

6. The air bearing shaft of claim 1, wherein the chrome plating includes a mirror finish.

7. An air bearing assembly for a cabin air compressor, the air bearing assembly comprising:
   an air bearing shaft comprising:
      a first edge and a second edge;
      a surface extending between the first edge and the second edge; and
      chrome plating on the surface between the first edge and the second edge;
      wherein L1 is a first distance from the first edge of the air bearing shaft to a first end of the chrome plating;
      wherein L2 is a second distance from the first edge of the air bearing shaft to a second end of the chrome plating;
      a chrome fade out on the surface of the air bearing shaft between the second end of the chrome plating and the second edge of the air bearing shaft;
      wherein L3 is a third distance from the first edge of the air bearing shaft to an end of the chrome fade out; and
   a bearing sleeve coaxially positioned around the air bearing shaft; and
   bearing foil lining an inner surface of the bearing sleeve.

8. The air bearing assembly of claim 7, wherein the chrome plating on the surface of the air bearing shaft extends beyond the bearing foil in an axial direction such that the bearing foil does not contact the surface of the air bearing shaft.

9. The air bearing assembly of claim 7, wherein a ratio of L2 to L1 is between 6.700 and 318.000.

10. The air assembly of claim 7, wherein a ratio of L3 to L2 is between 0.874 and 1.187.

11. The air bearing assembly of claim 7, wherein a ratio of L3 to L1 is between 6.950 and 318.000.

12. The air bearing assembly of claim 7, wherein L1 is between 0.0254 centimeters (0.010 inches) and 1.016 centimeters 0.400 inches, L2 is between 6.8072 centimeters (2.680 inches) and 8.0772 centimeters (3.180 inches), and L3 is between 6.8072 centimeters (2.680 inches) and 8.0772 centimeters (3.180 inches).

13. The air bearing assembly of claim 7, wherein the chrome plating on the air bearing shaft includes a mirror finish.

* * * * *